United States Patent [19]

Lin

[11] Patent Number: 5,967,088
[45] Date of Patent: Oct. 19, 1999

[54] WATERTIGHT PLUG STRUCTURE FOR AN AQUARIUM

[76] Inventor: Hsi-Chun Lin, P.O. Box 96-405, Taipei, Taiwan, 10098

[21] Appl. No.: 08/959,060

[22] Filed: Oct. 28, 1997

[51] Int. Cl.[6] .................................................... A01K 63/00
[52] U.S. Cl. .............................. 119/269; 119/253; 40/406
[58] Field of Search ..................................... 119/245, 247, 119/253, 269; 40/406; 446/267

[56] References Cited

U.S. PATENT DOCUMENTS

| | | | |
|---|---|---|---|
| 1,723,272 | 8/1929 | Emma | 119/247 X |
| 3,316,882 | 5/1967 | Renwick | 119/269 |
| 5,469,811 | 11/1995 | Lin | 119/269 X |
| 5,775,014 | 7/1998 | Lin | 40/406 |
| 5,816,884 | 10/1998 | Chang | 446/267 |

Primary Examiner—Robert P. Swiatek
Attorney, Agent, or Firm—Dougherty & Troxell

[57] ABSTRACT

A structure for a watertight plug in an aquarium, having a positioning ring fitted in a neck portion of the aquarium, the watertight plug having a positioning ring and a ring flange so as to fit in the neck portion of a glass bowl of the aquarium, a flat portion on the top of the watertight plug having a plurality of buffer grooves, which have various and suitable shapes and sizes. Each of the buffer grooves has a thin film portion extending downwards from the groove mouth to form a curved bottom side, and then the thin film extends upwards and towards the center to form a separation plate. Such a structure can provide the glass bowl with a buffer effect to prevent the water from leaking out of the glass bowl or air being sucked into the glass bowl to form an air chamber.

7 Claims, 7 Drawing Sheets

WATERTIGHT PLUG STRUCTURE FOR AN AQUARIUM

BACKGROUND OF THE INVENTION

1. Field of the Invention

This invention relates to a decorative aquarium, and particularly to a water tight plug, which can provide a buffer effect for ambient temperature variation.

2. Description of the Prior Art

A conventional aquarium usually comprises a glass bowl with neck portion on the bottom thereof, and a watertight plug having a positioning ring. The watertight plug is mounted in the neck portion of the glass bowl by means of the positioning ring and a ring flange; the water in the glass bowl is isolated from the atmosphere completely. The decorative aquarium is usually mounted in a round hole of a decorative body by means of the neck portion of the glass bowl, and silicone is used to glue them together. The bottom of the decorative body usually has a music assembly so as to provide visual and listening pleasure.

In the conventional decorative aquarium, the glass bowl and the watertight plug are put into the water before being assembled together so as to remove air from the glass bowl. The watertight plug and the decorations therein have no air bubbles attached. After the neck portion of the glass bowl and the watertight plug are connected together, water cannot leak out because the watertight plug being is made of a resilient and sealing material. The inside of the glass bowl has no air left. However, variable ambient temperature may cause the pressure inside the glass bowl to vary; in the event of the increasing or decreasing pressure being higher than the connection and sealing force between the glass bowl and the watertight plug, the water in the glass bowl may leak out, or air might be sucked in to cause an air chamber to exist in the glass bowl.

In the conventional decorative aquarium, the flat portion on the watertight plug has a plurality of grooves which are made of a thinner material so as to allow for the expansion or shrinkage effect under different temperatures. However, the expansion tolerance of the flat portion of the groove is limited; it can only improve the problem of a conventional aquarium to some extent without solving such problem completely.

SUMMARY OF THE INVENTION

The prime object of the present invention is to provide a watertight plug to fit in the neck portion of a glass bowl in an aquarium. The flat portion on the watertight plug has a plurality of buffer grooves, which can absorb the expansion and shrinkage of pressure in the glass bowl so as to prevent water from leaking out, or to prevent air from being sucked into the glass bowl to form an air chamber.

Another object of the present invention is to provide a watertight plug, of which the flat portion has a plurality of elongate and curved buffer grooves; the thin film of the buffer grooves extends from the flat portion downwards a suitable length to form a bottom side and then extends towards the center thereof; since the curved thin film of the elongate and curved buffer groove has resilience to provide a buffer effect, the expansion or shrinkage can be absorbed and offset.

Still another object of the present invention is to provide a watertight plug, in which the center of the elongate and curved buffer groove has a separation plate; the bottom side of the buffer groove extends towards a center and upwards; a separation groove is formed under the bottom side, and it is substantially an elongated hollow space to provide a buffer effect.

A further object of the present invention is to provide a watertight plug, in which the center of the elongate and curved buffer groove has a separation plate, and the thin film on the bottom side extends towards the center thereof and upwards; the bottom side has an elongate hollow space. The resilience of the thin films and the up-and-down motion of the separation plate provides a buffer space.

A still further object of the present invention is to provide a watertight plug, in which the top part thereof has a plurality of buffer grooves of various shapes, such as elongate and curved grooves, sector-shaped grooves, oblong grooves or round grooves. Since the curved thin film of the buffer groove is resilient and able to move up and down, it can provide a buffer effect.

DETAILED DESCRIPTION OF THE PREFERRED EMBODIMENTS

Figure 1:
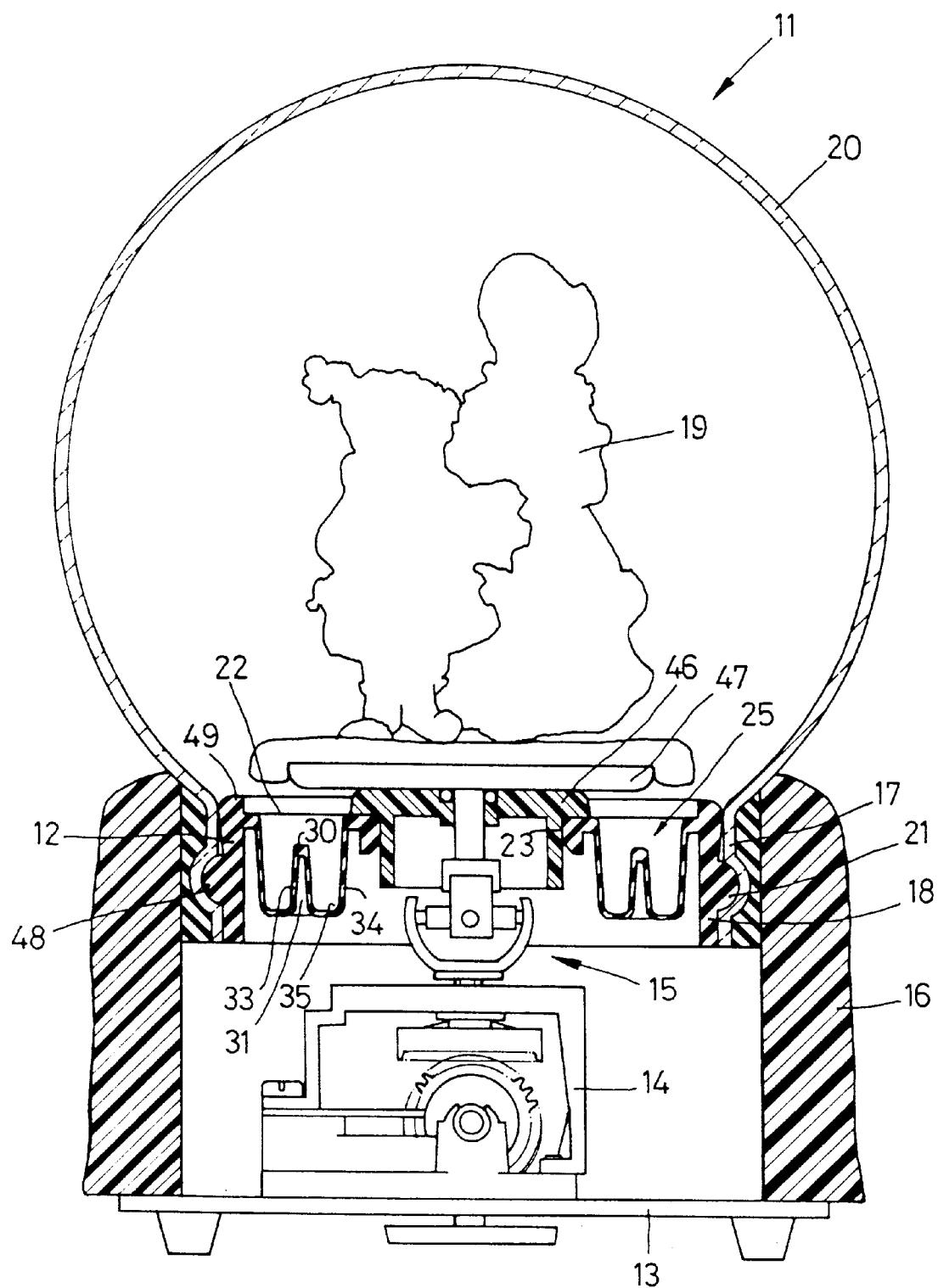
FIG. 1 is a sectional view of the present invention, showing the embodiment of a transmission mechanism connected with a music assembly under the aquarium thereof.

This invention relates to a structure of a watertight plug for an aquarium; as shown in FIG. 1, the aquarium 11 has the features of decoration and motion; on the base 13 thereof, there is a music assembly 14 mounted with a transmission mechanism 15. The base 13 is mounted under a decorative body 16. In a round hole 23 in the center of the watertight plug 12 is mounted a fixed disk 46, on which a turntable 47 is fitted; the spindle of the turntable 47 penetrates through a spindle hole of the fixed disk 46 and then connects with the transmission mechanism 15 under the watertight plug 12. The glass bowl 20 is substantially a ball-shaped bowl, having a neck portion 17 to be mounted on the decorative body 16. During assembly, the top side of the turntable 47 must be glued to the decorations 19 before the glass bowl 20 and the watertight plug 12 are put in a water tank so as not to have any air left in the glass bowl 20; the watertight plug 12 and the decorations will have no air bubbles attached. The watertight plug 12 is mounted in the neck portion 17 of the aquarium 11. Water in the glass bowl 20 provides the effect of enlarging the decorations 19. The turntable 47 in the center of the watertight plug 12 is connected with a transmission mechanism 15 through a spindle, and then it is assembled together with the decorative body 16. The aquarium 11 is driven by means of the music assembly 14 through the transmission mechanism 15; the decorations 19 mounted in the glass bowl 20 will move upon rotation of the turntable 47.

Figure 2:
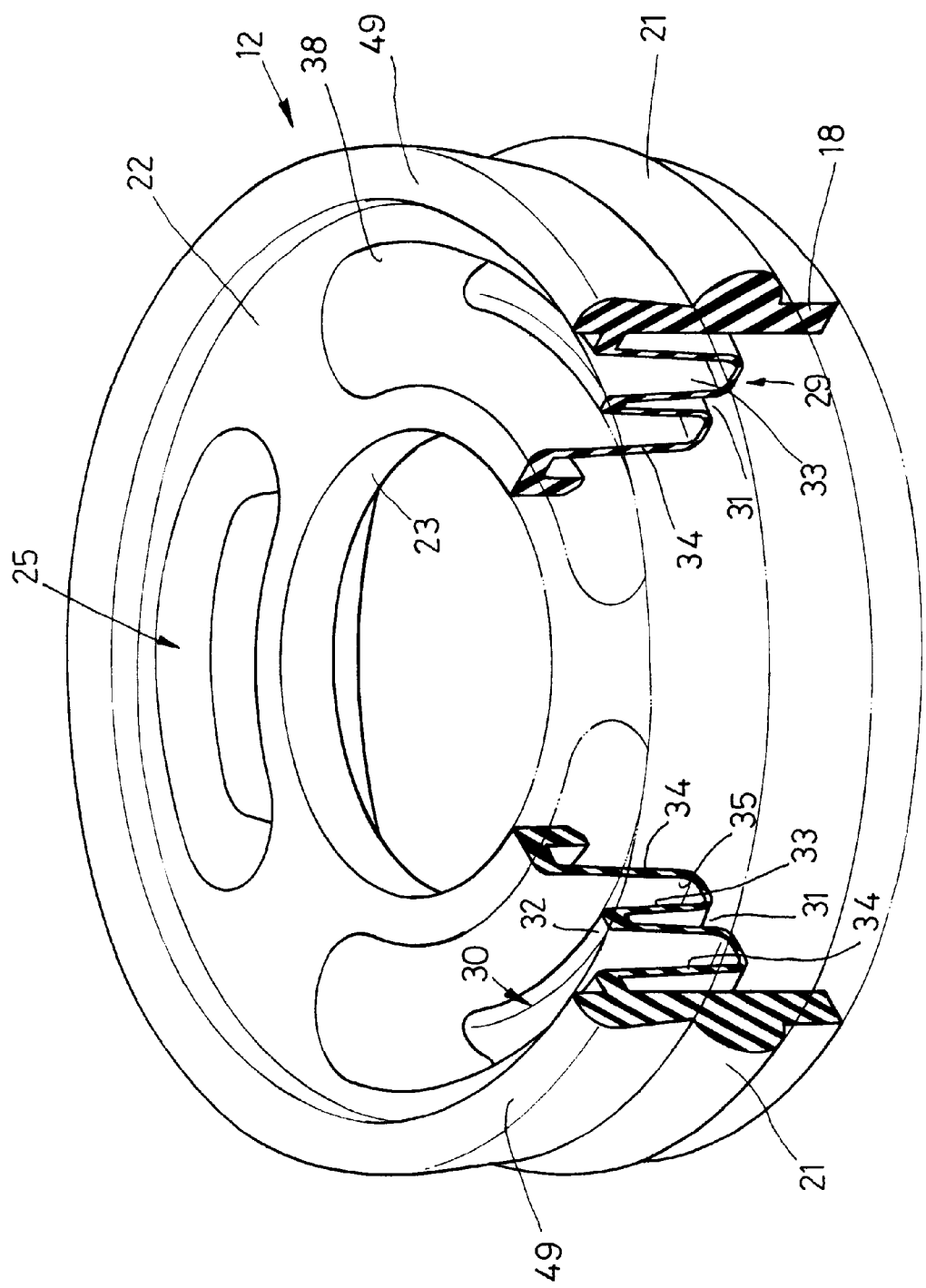
FIG. 2 is a fragmental section view of the present invention, showing the structure of the watertight plug thereof.
Figure 3:
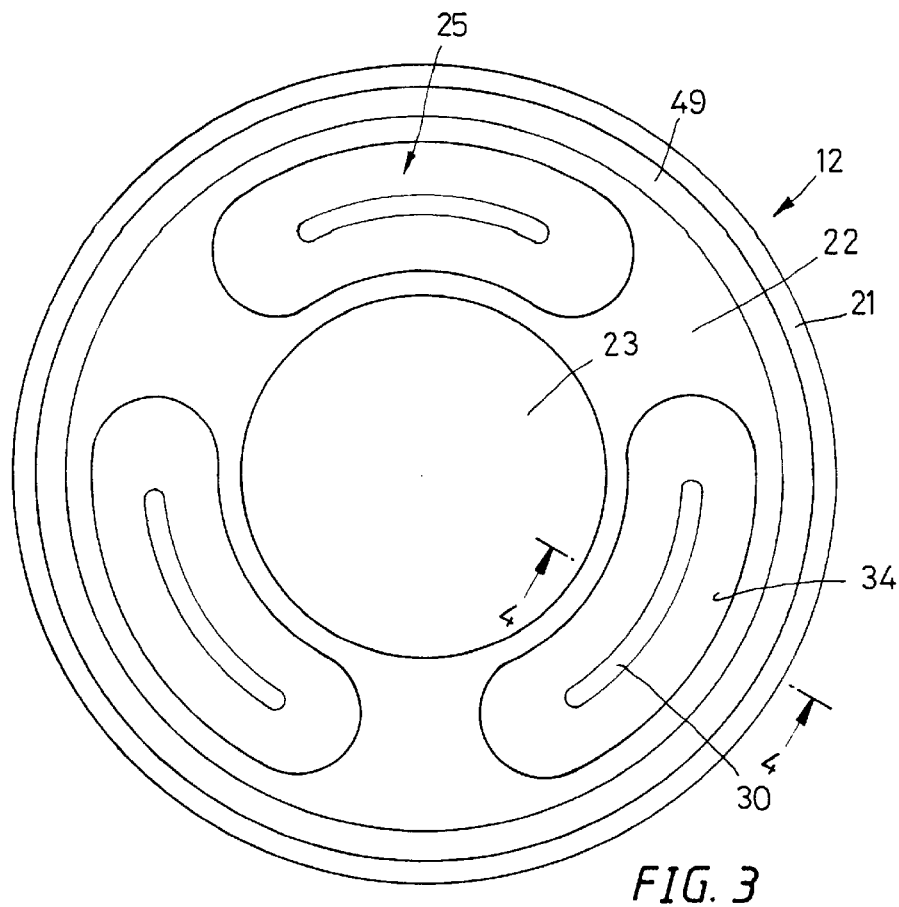
FIG. 3 is a plan view of the present invention, showing a top view of the watertight plug.
Figure 4:
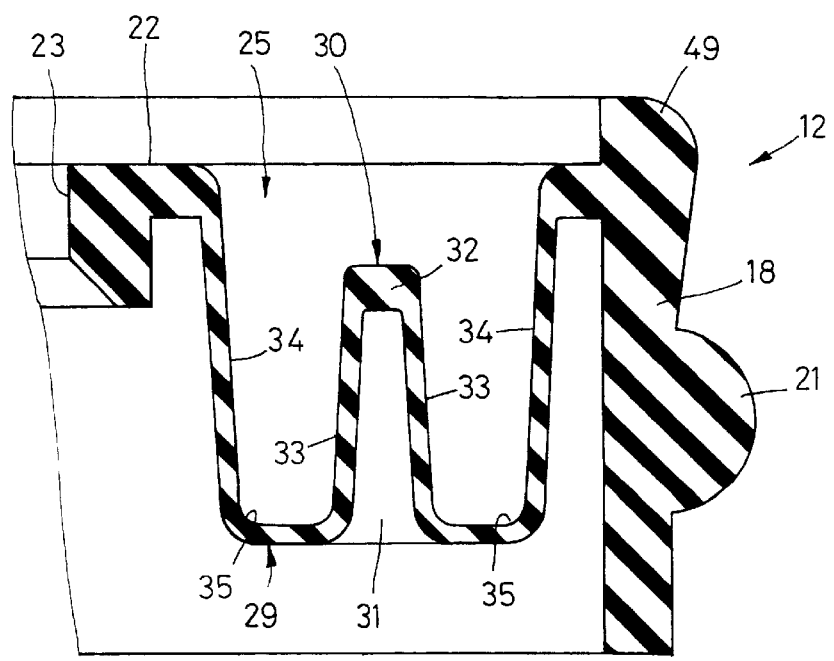
FIG. 4 is a fragmental section view of the present invention, along line 4—4 shown in FIG. 3.

The watertight plug 12 mounted on the neck portion 17 of the glass bowl 20 as shown in FIGS. 1 and 2 is made of a resilient and sealing rubber or silicone. The watertight plug 12 has a positioning ring 18, of which the size is similar to that of the neck portion 17. The outer surface of the positioning ring 18 has a ring flange 21, with which the positioning ring 18 can be closely fitted in the neck portion 17 of the glass bowl 20.

Figure 5:
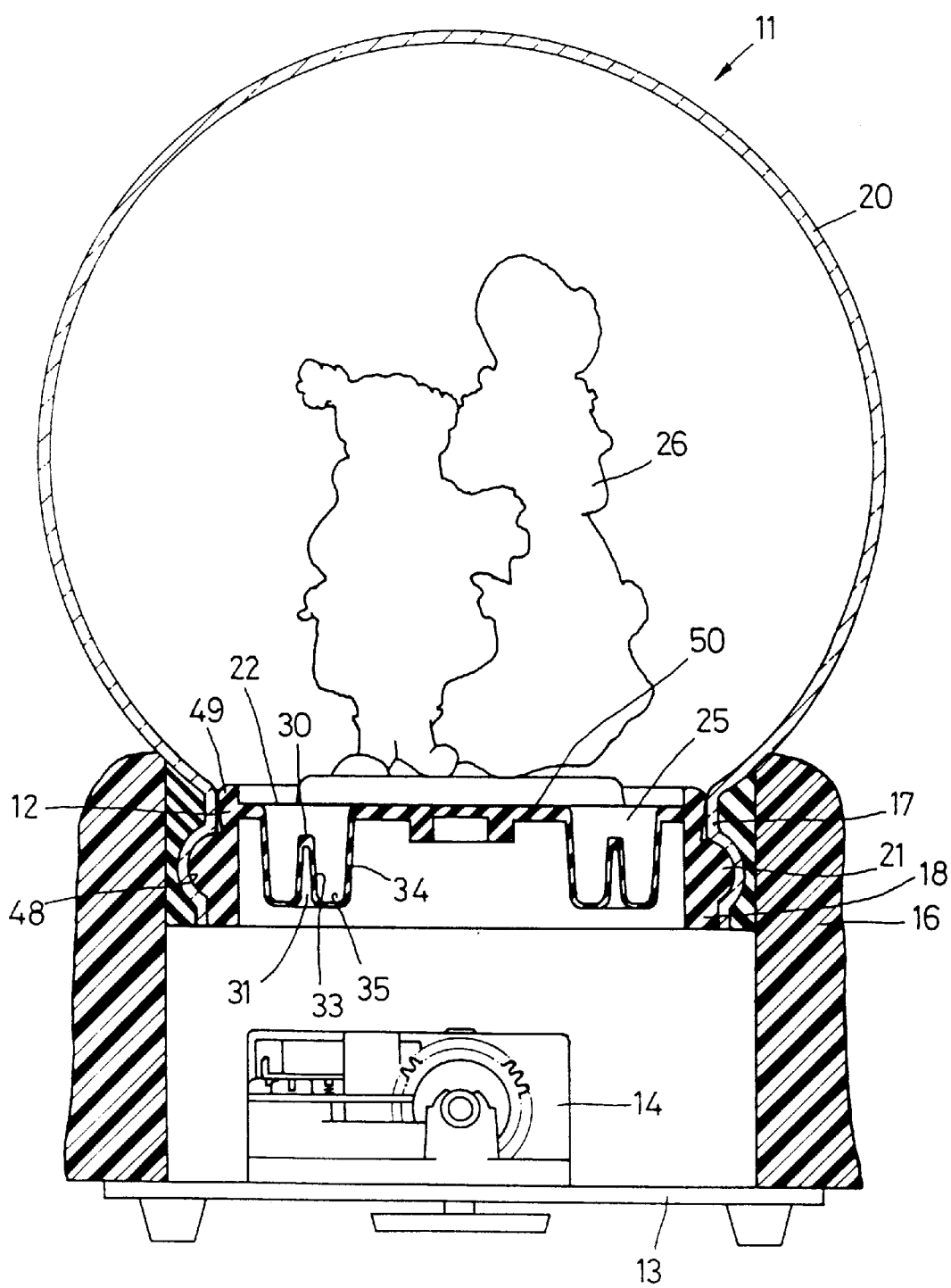
FIG. 5 is a sectional view of the present invention, showing a second embodiment of the buffer groove of the watertight plug thereof.
Figure 6:
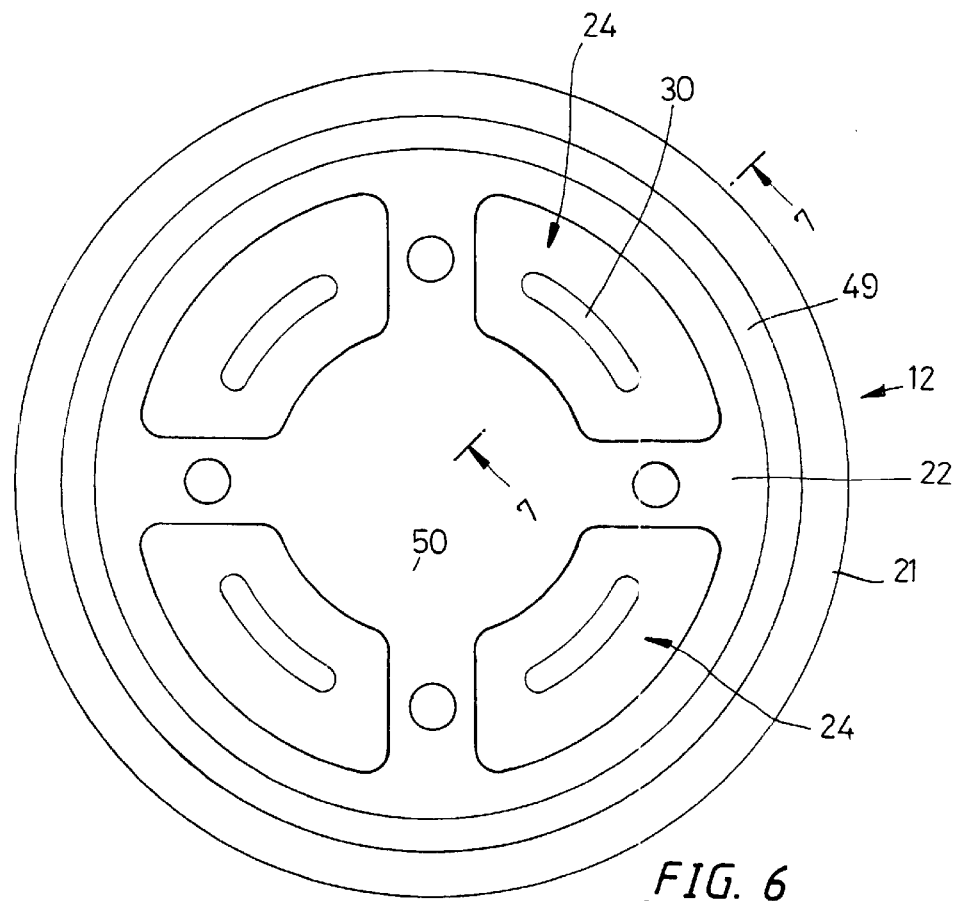
FIG. 6 is a plan view of the present invention, showing the top view of the watertight plug.
Figure 7:
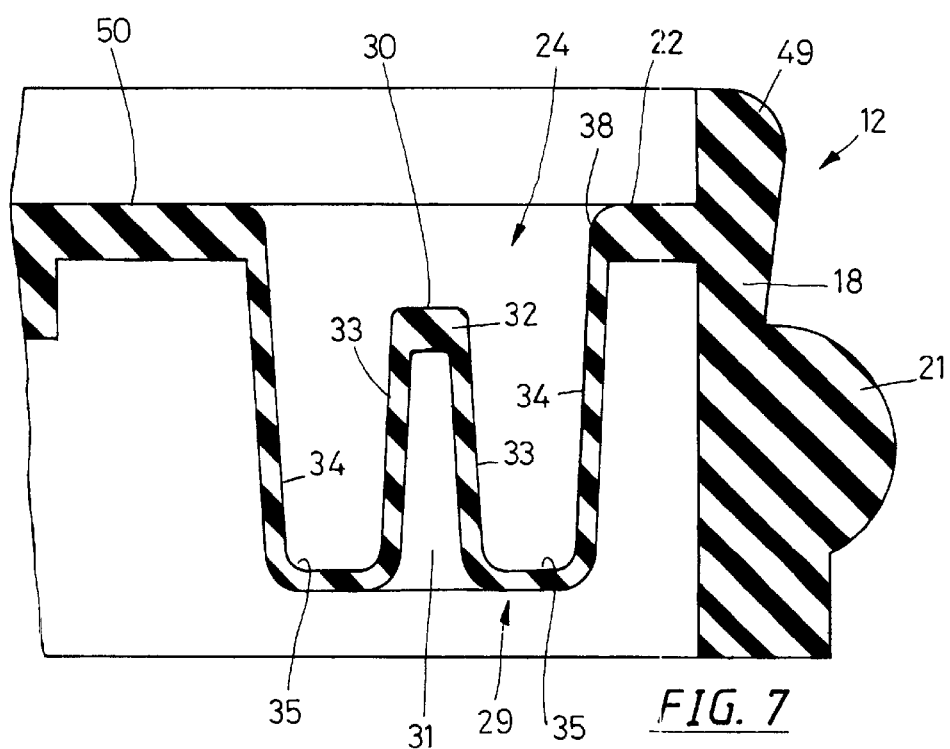
FIG. 7 is a fragmental section view of the present invention along line 7—7 shown in FIG. 6.

As shown in FIGS. 1 to 4, the watertight plug 12 has a lip portion 49 above the positioning ring 18; the lip portion 49 has flat portion 22 having a given thickness and a round hole 23 in the center thereof; the fixed disk is mounted and glued in the round hole 23. The spindle hole in the center of the fixed disk 46 is used for receiving the spindle of the turntable 47, and the spindle extends to and under the watertight plug 12. Referring to FIGS. 5 to 7, the flat portion 22 on the watertight plug 12 has a flat surface 50 to provide a hermetic seal. The flat surface 50 of the watertight plug 12 is glued with decorations first, and then the watertight plug 12 and the glass bowl 20 are put in water; the neck portion 17 of the glass bowl 20 is sealed up with the watertight plug 12.

The buffer grooves 25 on the flat portion 22 of the watertight plug 12 will provide a buffer effect upon temperature variation so as to prevent having a water leak or sucking air into the glass bowl 20 to form an air chamber.

As shown in FIGS. 1 to 4, the flat portion 22 on the watertight plug 12 has a plurality of buffer grooves 25; the flat portion 22 has a suitable thickness, and a round hole 23 in the center thereof. Between the round hole 23 and the lip portion 49, there is a plurality of buffer grooves 25, of which each is an elongate and curved groove along the spaced between the round hole 23 and the lip portion 49. From the groove mouth 38 of the buffer groove 25, a thin film 34 extends downwards a suitable distance. The bottom side 29 of the thin film 34 extends to the center thereof to form a curved surface 35 with a suitable width. Then, a thin film 33 having the same thickness extends upwards. The center part of the elongate and curved groove 25 has a curved separation plate 30; the separation plate 30 has a height slightly lower than that of the groove mouth 38, and has a thicker top part 32. The separation plate 30 extends towards the bottom side 29 of the buffer groove 25 by means of a curved thin film 33 so as to form into a separation groove 31. By means of a space under the separation groove 31 and the resilience of the elongate and curved groove 25, a suitable buffer effect can be provided.

After the watertight plug 12 with buffer grooves 25 is mounted in the neck portion 17 of the glass bowl 20, the watertight plug 12 and the glass bowl 20 are put in water simultaneously; in that case, no air bubbles will be produced in the glass bowl 20; the outer surface of the watertight plug 12 will also have no air bubbles attached. During assembly, the watertight plug 12 is inserted into the neck portion 17 of the glass bowl 20 before fitting the ring flange 21 into the ring-shaped groove 48 of the neck portion 17 so as to have the ring flange 21 of the watertight plug 12 and the ring-shaped groove 48 of the neck portion 17 hermetically engaged.

After the glass bowl 20 and the watertight plug 12 are assembled together, the water in the glass bowl has a considerable weight; by means of the neck portion 17 and the watertight plug 12, the glass bowl 20 becomes a hermetic space. Since the thin film of the buffer groove 25 has a suitable thickness, it will not deform.

The elongate and curved groove 25 extending downwards from the flat board 22 will provide a buffer effect. In fact, the buffer effect of the elongate and curved groove 25 is furnished by means of, first, thin film 34 extending downwards from the groove mouth 38 and the flat portion 22; second, the curved surface 35 on the bottom side 29 of the ring-shaped thin film 34, and a separation plate 30 and a space under the separation groove 31; the ring-shaped thin film 34 is made of resilient material for absorbing the expansion or shrinkage of water in the glass bowl; third, the bottom side 29 of the elongate and curved groove 25, the inner thin film 33 and the outer thin film being formed into a curved surface 35, which all can provide a buffer effect by allowing the separation plate 30 to move downwards.

Referring to FIGS. 5 to 7, the flat portion 22 on the watertight plug 12 has a sealed surface 50 glued to the bottom of the decorations. The flat portion 22 has a plurality of symmetrically arranged sector-shaped recesses 24. The sector-shaped recess 24 has curved thin film 34 extending downwards and curved surface 35 on the bottom side 29 thereof extending towards the center thereof. From the inner side of the curved surface 35, a thin film 33 with the same thickness as that of the thin film 34 extends upwards. The center of the sector-shaped recess 24 has a curved separation plate 30; the sector-shaped recess 24 can provide a buffer effect, the same as that of the elongate and curved groove 25 as mentioned above.

Figure 8:
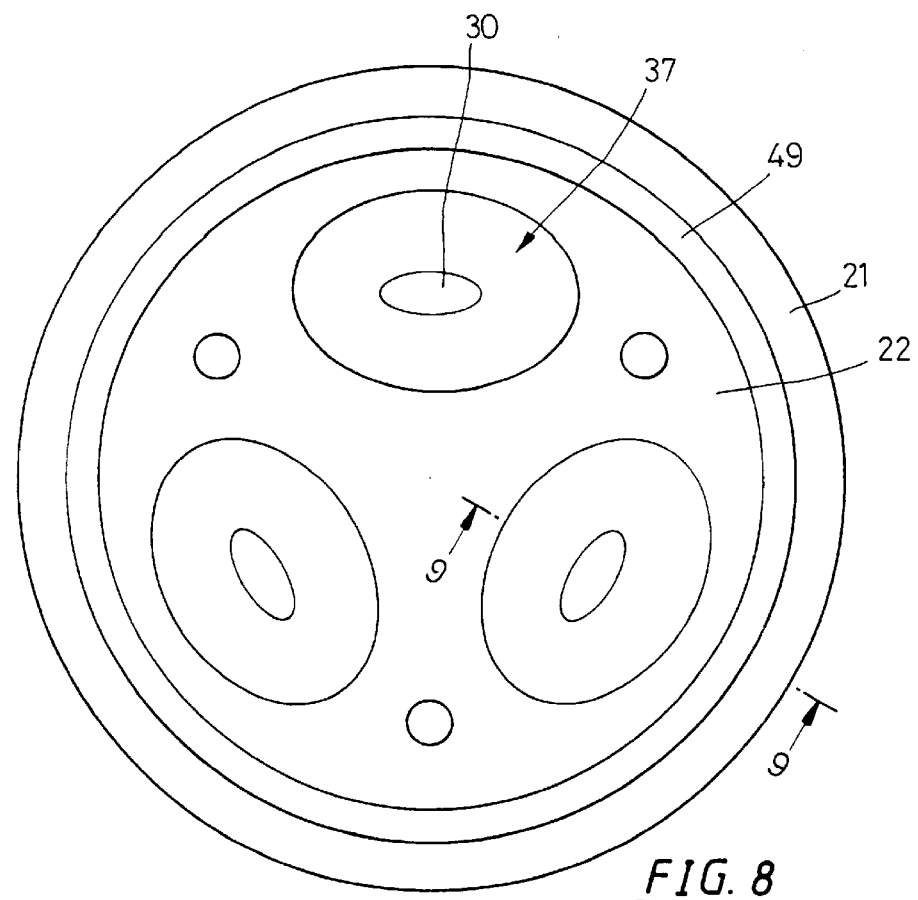
FIG. 8 is a plan view of the present invention, showing a third embodiment of the buffer groove of the watertight plug thereof.
Figure 9:
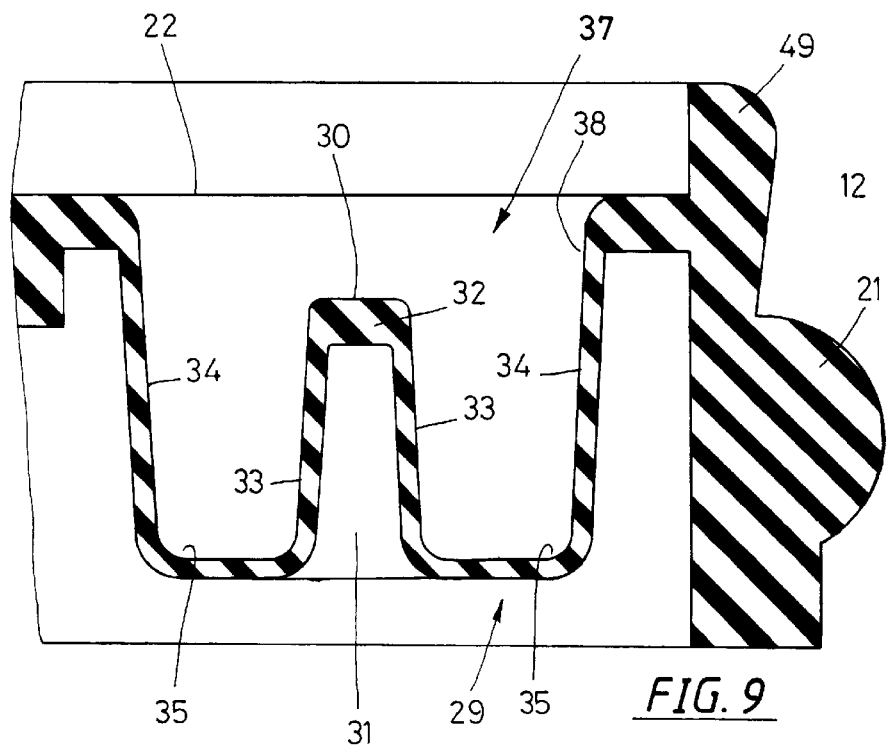
FIG. 9 is a fragmental section view of the present invention along line 9—9 shown in FIG. 8.

Referring to FIGS. 5, 8 and 9, the flat portion 22 of the watertight plug 12 is provided with a plurality of oblong symmetrically arranged buffer grooves 37. The oblong buffer grooves 37 have curved thin film 34 extending from the flat portion 22 downwards, and a bottom side 29 extending towards the center thereof to form a curved surface 35 with a suitable width. On the inner edge of the curved surface 35, a thin film 33 with the same thickness as that of the thin film 34 extends upwards to form an elongate separation plate 30 in the center of the oblong buffer groove 37, which can provide a buffer effect the same as that of the aforesaid sector-shaped recess 24 or the elongate and curved groove 25.

Figure 10:
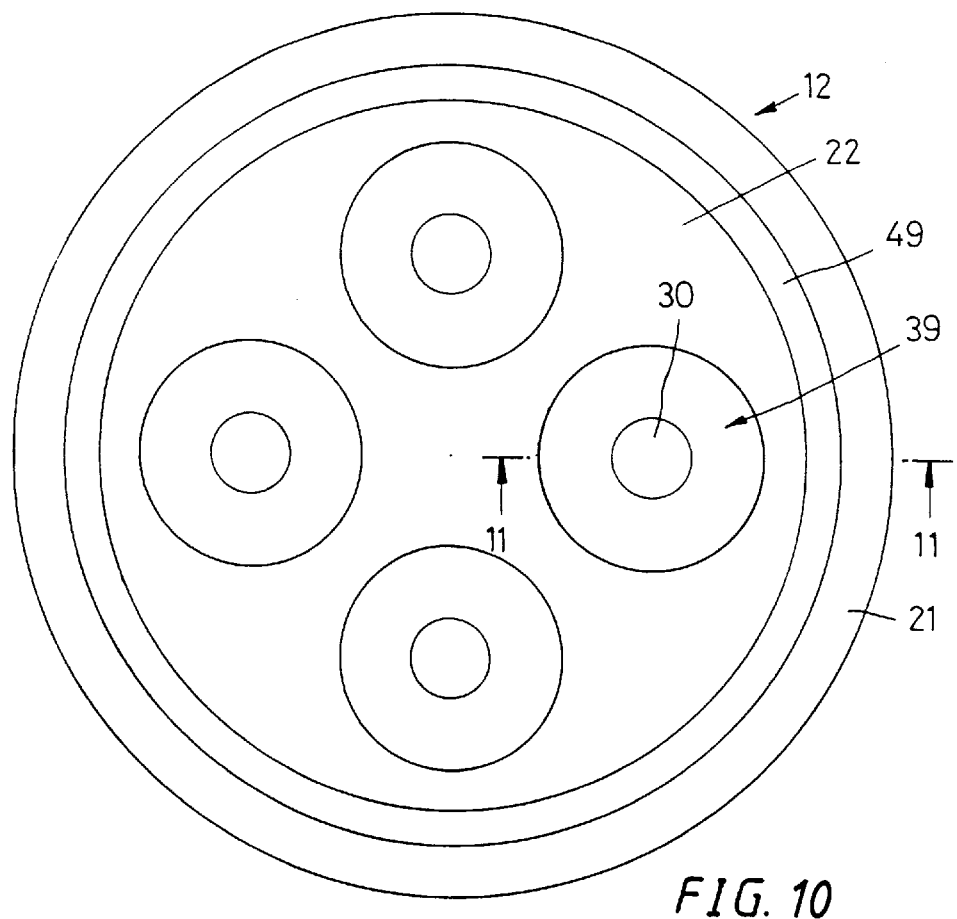
FIG. 10 is a plan view of the present invention, showing a fourth embodiment of the buffer groove of the watertight plug thereof.
Figure 11:
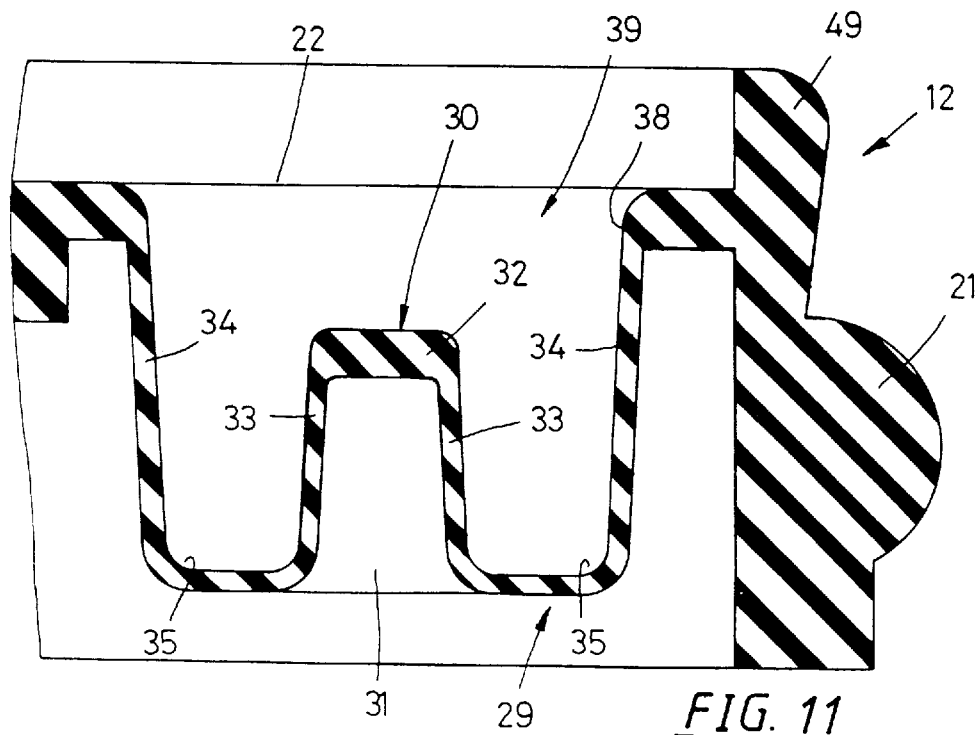
FIG. 11 is a fragmental section view of the present invention along line 11—11 shown in FIG. 10.

Referring to FIGS. 10 and 11, the flat portion 22 of the watertight plug 12 has a plurality of round symmetrically arranged buffer grooves 39. A round thin film 34 from the groove mouth 38 extends downwards to form a bottom side 29 and a curved surface 35. Then a thin film 33 having the same thickness as that of the thin film 34 extends upwards to form into a tapered separation plate 30 in the center of the round buffer groove 39 so as to provide a buffer effect the same as that of the aforesaid sector-shaped recess 24, the elongate and curved groove 25, or the oblong buffer groove 37.

The feature as disclosed in the aforesaid embodiments of the present invention is that the flat portion 22 of the watertight plug 12 has a plurality of buffer grooves 25, which has a suitable shape, and a groove mouth; a thin film 34 extends downwardly from the flat portion 22 and the groove mouth; the curved thin film 34 has a bottom side 29 with a curved surface 35; the thin film also extends to the center and upwards to form a separation plate 30, under which a separation groove 31 is located. By means of the resilient thin film, the shape of the buffer groove 25 and the buffer space, a buffer effect will be provided.

According to the aforesaid description of the embodiments, it is apparent that the feature and structure of the present invention have been disclosed completely, i.e., the present invention has provided a prominent improvement for the watertight plug, and such feature has never been anticipated and shown by any one before; therefore, the present invention is deemed unique and novel.

I claim:

1. A structure of a watertight plug mounted in a neck portion of a glass bowl aquarium, the watertight plug made of a resilient and hermetic material, and comprising: a positioning ring configured to fit in said neck portion and a ring flange; a lip portion located above said ring flange; a flat portion located within said lip portion, said flat portion having a plurality of buffer grooves, each of said buffer grooves having a groove mouth and a first thickness; a curved thin film having a second thickness less than the first thickness and extending downwards from said groove mouth and then extended horizontally to form a bottom side and a curved surface toward a center of the buffer groove; a second thin film with the second thickness extending upwards to form a top part with a separation groove formed under said top part and between adjacent bottom sides whereby said buffer grooves provide a buffer effect because said thin films having a resilience and are able to move up and down.

2. The structure for a watertight plug in an aquarium claimed in claim 1, wherein said flat portion of the watertight plug has a round hole in a center thereof and wherein said buffer grooves are located in said flat portion between said round hole and said lip portion.

3. The structure for a watertight plug in an aquarium as claimed in claim 2, wherein said buffer grooves each have an elongated curved shape.

4. The structure for a watertight plug in an aquarium as claimed in claim 1, wherein a center of said flat portion comprises a flat surface and wherein the buffer grooves each have an elongated curved shape.

5. The structure for a watertight plug in an aquarium as claimed in claim 1 wherein said buffer grooves comprise sector-shaped recesses.

6. The structure for a watertight plug in an aquarium as claimed in claim 1 wherein each of said buffer grooves comprises an oblong buffer groove.

7. The structure for a watertight plug in an aquarium as claimed in claim 1 wherein each of said buffer grooves comprises a round buffer groove.

* * * * *